UNITED STATES PATENT OFFICE.

PIERRE PROSPER MONNET, OF LYONS, FRANCE.

PROCESS OF MAKING RHODINOL.

SPECIFICATION forming part of Letters Patent No. 548,719, dated October 29, 1895.

Application filed February 20, 1895. Serial No. 539,121. (Specimens.) Patented in France December 4, 1893, No. 234,540; in Germany December 15, 1893, No. 80,007; in Austria-Hungary June 20, 1894, No. 68,015 and No. 5,488, and in Austria January 8, 1895, No. 45/85.

*To all whom it may concern:*

Be it known that I, PIERRE PROSPER MONNET, manufacturer, a citizen of the French Republic, residing at 8 Quai de Retz, Lyons, in the Department of the Rhône, France, have invented new and useful Improvements in the Manufacture of Scent Essences, (which have been patented in France by Letters Patent No. 234,540, dated December 4, 1893, and Letters Patent of Addition dated August 4, 1894; in England by Letters Patent No. 15,171, dated August 8, 1894; in Austria-Hungary by Letters Patent No. 68,015 and No. 5,488, dated June 20, 1894; in Austria by Letters Patent No. 45/85, dated January 8, 1895, and in Germany by Letters Patent No. 80,007, dated December 15, 1893,) of which the following is a specification.

This invention relates to the manufacture of a scent alcohol termed "rhodinol," which has all the properties of and is capable of replacing in its industrial purposes attar of roses; and it consists of a process for the manufacture of the said rhodinol from a special source. I have found that the essences of commerce obtained from the geraniums, and especially from the *Pelargonium odoratissimum*, contain variable quantities of the rhodinol.

By careful experiments I have succeeded in isolating the rhodinol from the odorous or other components with which it is mixed by operating in the following manner: The raw oil of pelargonium is first treated in a closed vessel with an alcoholic solution of caustic potash or soda in order to saponify the ethers to neutralize the free acids and to destroy the aldehydes, with their disagreeable odor, that exist therein. The operation is carried out as follows: The oil is placed in a disgester, and to it is added the alcoholic solution of caustic potash or soda, composed of the proportion of two hundred and fifty grams of alcohol with one hundred and fifty grams of caustic potash of seventy-five per cent. alkaline strength or of two hundred and fifty grams of alcohol with one hundred and ten grams of caustic soda of seventy-five per cent. alkaline strength to be mixed with one liter of oil of pelargonium. The mixture is heated in a closed digester or vessel for two hours at 100° centigrade, and then the alcohol is separated by distillation. The oil thus treated is washed once with water and then a second time with a solution of sulphuric acid with a strength of two and one-half to one hundred, so as to eliminate the last traces of alkali. The oil is then washed twice with water, is decanted, dried, and submitted to a series of fractional distillations under vacuum. The fractional distillations are effected in a suitable distilling apparatus under a pressure of ten millimeters of mercury above vacuum.

*First fractional distillation.*—In the first distillation the parts which distill at the following temperatures, centigrade, are collected separately: from 80° to 90° centigrade, from 90° to 100° centigrade, from 100° to 110° centigrade, and from 110° to 125° centigrade.

*Second fractional distillation.*—In this second distillation the distillate separated up to 90° centigrade is eliminated and the other three distillates are further separately distilled, the distillates between the following temperatures being separately collected: from 90° to 100° centigrade, from 100° to 105° centigrade, from 105° to 110° centigrade, from 110° to 115° centigrade, and from 115° to 125° centigrade.

*Third fractional distillation.*—In this distillation the distillate obtained in the prior distillation between 90° and 100° centigrade is put on one side, and each of the other four distillates is again separately distilled within the same limits as in the preceding distillation. In this last distillation the portions which distill between 100° and 115° centigrade diminish considerably, and the major portion of the product passes over between 115° and 120° centigrade. It is this last portion which contains the rhodinol. A good oil of pelargonium should not contain less than sixty per cent. of this last distillate.

To complete the treatment the distillate collected between 115° and 125° centigrade is placed in an enameled digester with glacial acetic acid in the proportions of fifteen hundred and forty grams of rhodinol and one thousand grams of glacial acetic acid. The mixture is heated for about twelve hours at 180° centigrade temperature, and is then heated with water to remove the acetic acid which has not reacted. The insoluble product, which is acetic ether of rhodinol, is washed several times, is dried, and distilled under vacuum. This ether distills regularly between 118° and 122° centigrade under a pressure of ten millimeters of mercury above vacuum. It is saponified by suitable quantities of alcoholic caustic potash or soda, with which to regenerate the rhodinol. The thus-treated rhodinol is washed first with distilled water, then with acidulated water, and then again with pure water until the alkali is separated, thus completing its regeneration, and afterward dried and submitted to a last rectification in vacuum. It then boils at 115° to 118° centigrade under a pressure of ten millimeters of mercury above vacuum and presents an appearance of an oily liquid quite polorless, possessing a delicious odor of roses.

The fractional distillates recovered between 90° and 100° centigrade from the second and third distillations should be collected and preserved. They are composed of a mixture of a particular alcohol termed "Licaréol" and of a special acetone identical to that which is contained in the essence of native menthene. This last substance possesses a very penetrating odor of peppermint.

The acids separated by the caustic potash and soda, and which were contained in the form of ethers in the raw oil of pelargonium, are acetic acids, isobutyric, isovalerianic, tiglic, or methylcrotonic acids. The last, which is a rare product, should be rigorously collected.

It is evident that in the before-described process the glacial acetic acid may be replaced by acetic anhydride.

It is possible to partially refine the raw oil of pelargonium by the above-indicated treatment with caustic potash or soda without first subjecting the said oil to the said fractional distillations.

What I claim as new, and desire to secure by Letters Patent, is—

1. In the process of manufacturing rhodinol from oil of geraniums, the improvement in the process which consists in extracting raw rhodinol by fractional distillation of oil of geraniums, converting said raw rhodinol into acetic ether of rhodinol by treating it with acetic acid, purifying the acetic ether of rhodinol thus obtained by washing and distillation, and regenerating the rhodinol by saponification of this acetic ether of rhodinol by treating it with alcoholic caustic alkali, then washing it and rectifying it.

2. In the process of manufacturing rhodinol from the natural oil of *Pelargonium odoratissimum*, the improvement in the process which consists in treating such oil with alcoholic caustic alkali, and subjecting the resulting product to several successive fractional distillations separating from said product during such distillations, as by-products, a mixture of licaréol and an acetone having an odor of menthene.

3. In the process of manufacturing rhodinol from the natural oil of *Pelargonium odoratissimum*, the improvement in the process which consists in treating said oil with an alcoholic caustic alkali, washing the resulting product, distilling the resulting product, and then converting the resulting product into acetic ether of rhodinol by heating it under pressure with acetic acid, and then purifying the acetic ether of rhodinol thus obtained by washing and distillation.

In witness whereof I have hereunto signed my name in the presence of two subscribing witnesses.

PIERRE PROSPER MONNET.

Witnesses:
 MARIUS VACHON,
 THOMAS N. BROWNE.